J. SIEMSEN.
DRAFT EQUALIZER.
APPLICATION FILED AUG. 20, 1908.
903,330.
Patented Nov. 10, 1908.
2 SHEETS—SHEET 2.
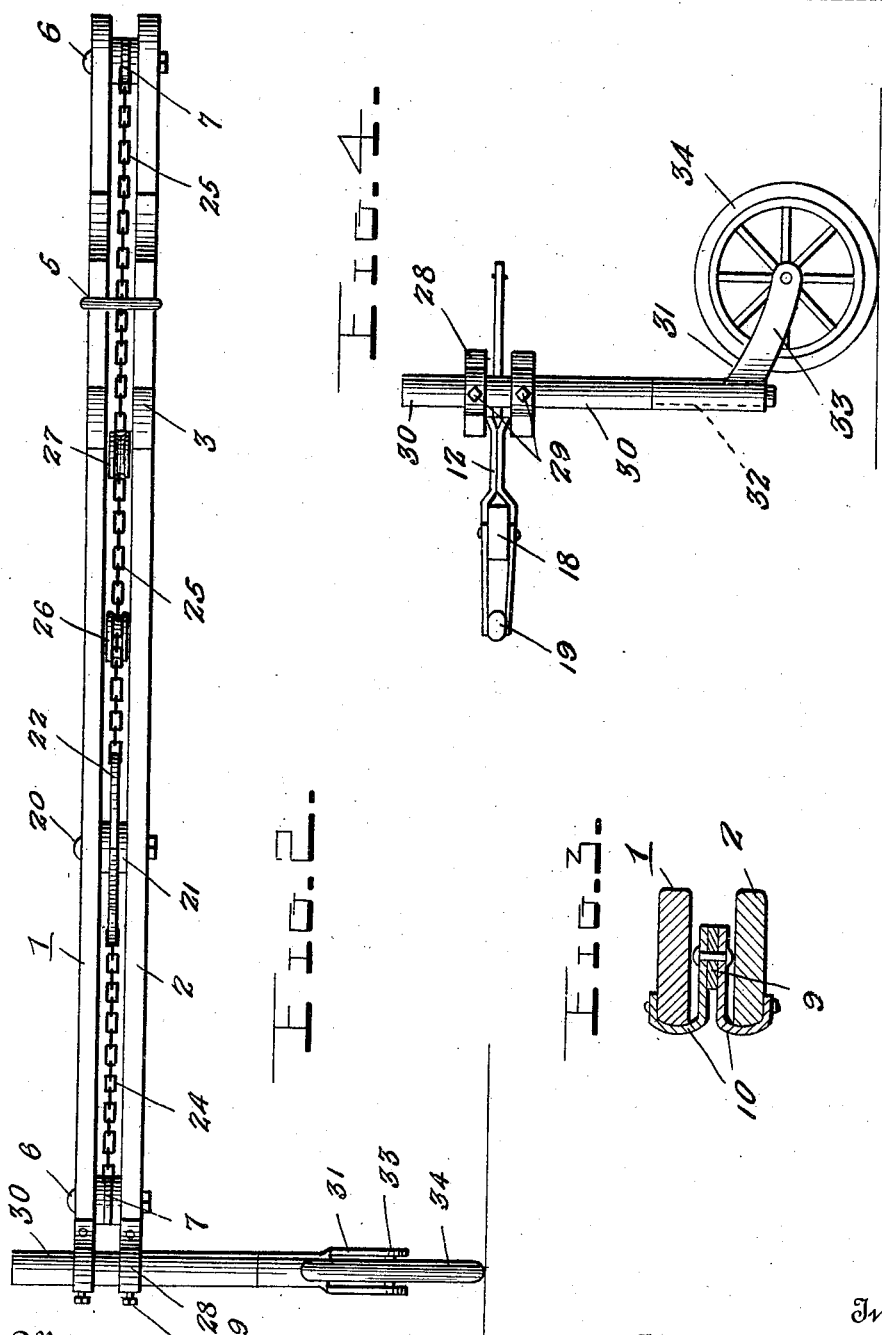
Witnesses
Chas. L. Griesbauer.
C. H. Griesbauer.
Inventor
Jurgen Siemsen
By H. B. Willson & Co.
Attorneys

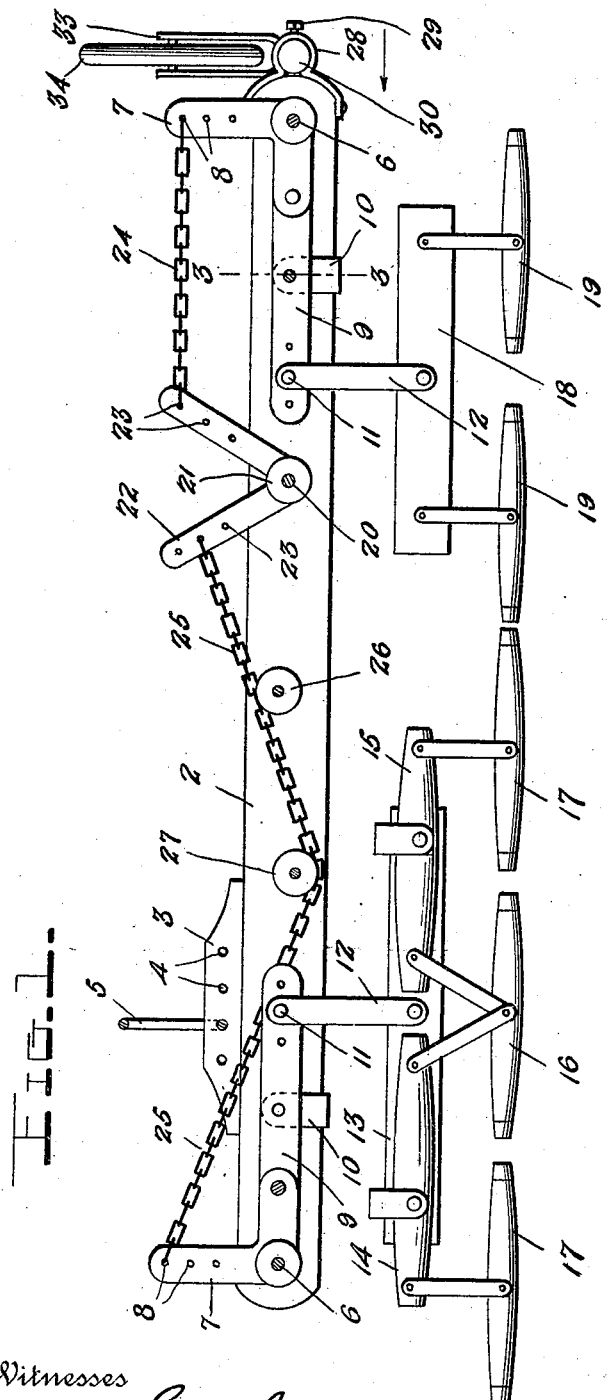

UNITED STATES PATENT OFFICE.

JURGEN SIEMSEN, OF KEARNEY, NEBRASKA, ASSIGNOR OF ONE-THIRD TO JOHN H. BEARSS AND ONE-THIRD TO DAVID L. KLINZMAN, BOTH OF KEARNEY, NEBRASKA.

DRAFT-EQUALIZER.

No. 903,330.         Specification of Letters Patent.      Patented Nov. 10, 1908.

Application filed August 20, 1908. Serial No. 449,556.

*To all whom it may concern:*

Be it known that I, JURGEN SIEMSEN, a citizen of the United States, residing at Kearney, in the county of Buffalo and State of Nebraska, have invented certain new and useful Improvements in Draft-Equalizers; and I do declare the following to be a full, clear, and exact description of the invention, such as will enable others skilled in the art to which it appertains to make and use the same.

My invention relates to draft equalizers, and particularly to that type for equalizing the draft of five horses for use in connection with binders, gang plows and the like.

The object of the invention is the provision of a device of this character whereby correct adjustments may be obtained to secure even and perfect draft.

With these and other objects in view, the invention consists of certain novel features of construction, combination and arrangement of parts, as will be more fully described and particularly pointed out in the appended claims.

In the accompanying drawings, Figure 1 is a top plan view with the upper frame member removed, Fig. 2 is a rear elevation, Fig. 3 is a transverse section on the line 3—3 of Fig. 1, and Fig. 4 is an end elevation looking in the direction of the arrow *a*.

Referring more especially to the drawings, 1 and 2 comprise the upper and lower members of the evener bar, and are each provided on their rear faces with an outstanding rib 3, having a series of perforations 4, to receive the attaching clevis 5, by which the device is secured to the draft bar of the binder or plow. Pivoted upon suitable pivotal bolts 6 at either end of the evener and between the members 1 and 2 are bell crank levers 7, having their outer ends provided with a plurality of adjusting holes 8, and their inner ends connected to suitable rock levers 9, which are pivoted intermediate their ends upon inwardly extending brackets 10, connected to the members 1 and 2. The opposite ends of the levers 9 are provided with suitable apertures through which the bolts 11 pass to connect the links 12 thereto. At the left hand end of the device and nearly opposite the clevis 5 I connect to the link 12 a large double-tree 13, to which is connected the evener members 14 and 15, both of which have link connection, at their inner ends with a swingle-tree 16, and at their outer ends with swingle-trees 17. The right hand lever 9 has connected to its link 12 the double-tree 18, having in either end thereof the link connected swingle-trees 19, as is usual.

Pivoted upon the bolt 20 and separated from the members 1 and 2 by thick washers 21 is a V-shaped evener lever 22, having each leg thereof provided with a series of adjusting holes 23, adapted to receive the connecting chains 24 and 25. The chain 24 is connected to the outer end of the right hand bell crank lever and directly with the right hand leg on the V-shaped evener while the chain 25 is connected with the left hand leg on the V-shaped evener, and at its opposite end is connected to the outer end of the left hand bell crank 7. The chain 25 passes over suitable pulleys 26 and 27, journaled upon the pintles carried by the members 1 and 2 so that the chain 25 is thrown out of the way of the clevis bolt. The first one of these pulleys 26 is journaled between the members 2 near their outer edges and the other roller 27 is journaled between the members 2 near their front edges. The first roller is approximately midway the ends of the evener members 1 and 2, and the V-shaped evener lever is placed a distance away from the center equaling the distance from the center of the clevis 5.

At the right hand or two horse end of the lever I provide a pair of clips or bands 28, each having set screws 29 passing therethrough to engage and hold in vertically adjusted position the pivoting rod 30 of the colter support 31. This colter support is journaled upon the reduced end 32 of the rod 30 and extends downwardly into bearing arms 33 to support the wheel 34. By this means it will be seen that the right hand or two horse end of the evener is properly supported at all times. It will be noticed that I have provided seven distinct adjustments, two on the bell crank levers, two on the evener levers, two for the rocking levers and one upon the evener members 1 and 2.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters Patent, is:—

1. A draft equalizer comprising an evener bar, a pair of bell crank levers pivoted one at each end thereof, rock levers connected on one end of said bell crank levers, whiffletrees connected to the opposite end of said lever, an adjusting device, and flexible connections between the adjusting device and the bell crank lever.

2. A draft equalizer comprising an evener bar, a pair of bell crank levers connected thereto one at each end, a pair of rock levers pivoted to the evener bar and connected at one end to the bell crank levers, whiffletrees connected to said rock levers, an adjusting device, and flexible connections adjustably connecting the bell crank levers and the adjusting device.

3. A draft equalizer comprising a pair of separated evener members, a pair of bell crank levers pivoted to said members at the ends thereof, rock levers pivoted between said evener members and connected at one end to the bell crank levers, whiffletrees adjustably connected to the opposite end of said bell crank levers, a V-shaped lever pivoted to said evener member and having a plurality of adjusting holes in either leg thereof, chains connecting the opposite legs of said V-shaped adjusting member and the free arms of the bell crank levers, pulleys for tightening one of said chains, and means for supporting one end of the evener member.

4. A draft equalizer comprising an evener bar, a pair of bell crank levers pivoted one at each end thereof, rock levers connected to one end of said bell crank levers, whiffletrees connected to the opposite end of said levers, an adjusting device, flexible connections connecting the adjusting device and the bell crank lever, and an adjustable evener wheel for supporting one end of the evener member.

In testimony whereof I have hereunto set my hand in presence of two subscribing witnesses.

JURGEN SIEMSEN.

Witnesses:
 DAN MORRIS,
 JOHN A. MILLER.